(12) United States Patent  
Chen et al.

(10) Patent No.: US 8,296,708 B1  
(45) Date of Patent: Oct. 23, 2012

(54) METHOD OF CONSTRAINT-HIERARCHY-DRIVEN IC PLACEMENT

(75) Inventors: Tung-Chieh Chen, Taipei (TW); Bo-Wei Chen, New Taipei (TW); Ta-Yu Kuan, Taitung County (TW)

(73) Assignees: Springsoft Inc., Hsinchu (TW); Springsoft USA, Inc., San Jose, CA (US)

( * ) Notice: Subject to any disclaimer, the term of this patent is extended or adjusted under 35 U.S.C. 154(b) by 0 days.

(21) Appl. No.: 13/349,584

(22) Filed: Jan. 13, 2012

Related U.S. Application Data

(60) Provisional application No. 61/489,269, filed on May 24, 2011.

(51) Int. Cl.  
*G06F 17/50* (2006.01)

(52) U.S. Cl. ............... 716/122; 716/119; 716/139

(58) Field of Classification Search ............ 716/119, 716/122, 139  
See application file for complete search history.

(56) References Cited

U.S. PATENT DOCUMENTS

| | | | | |
|---|---|---|---|---|
| 7,003,749 | B2* | 2/2006 | Subasic et al. | 716/122 |
| 7,386,823 | B2* | 6/2008 | Tsai et al. | 716/102 |
| 7,426,709 | B1* | 9/2008 | Ganesan | 716/138 |
| 7,603,642 | B2* | 10/2009 | Subasic et al. | 716/119 |
| 7,873,928 | B2* | 1/2011 | Lin et al. | 716/119 |
| 2002/0087953 | A1* | 7/2002 | Hines | 717/125 |

* cited by examiner

*Primary Examiner* — Naum Levin  
(74) *Attorney, Agent, or Firm* — Litron Patent and Trademark Office; Min-Lee Teng

(57) ABSTRACT

Disclosed is a computer-implemented method to generate a placement for a plurality of device modules within an analog integrated circuit (IC) subject to a set of constraints. By building a constraint hierarchy tree according to the constraints, conflicts of constraints can be identified and resolved. Furthermore, placements can be generated based on the hierarchy tree through a bottom-to-top dimension optimization process and a top-down wire length optimization process. Furthermore, a graphical user interface can be used to display the tree, and the user can edit the tree visually and interactively.

18 Claims, 14 Drawing Sheets

FIG. 7C

METHOD OF CONSTRAINT-HIERARCHY-DRIVEN IC PLACEMENT

CROSS REFERENCE TO RELATED APPLICATIONS

This application claims the benefit of priority of U.S. Provisional Application No. 61/489,269, filed May 24, 2011, and titled "Constraint Hierarchy Driven Automatic IC Placement", the contents of which are herein incorporated by reference in its entirety.

BACKGROUND OF THE INVENTION

1. Field of the Invention

The invention relates in general to a computer-implemented method for generating placements for integrated circuits (ICs) and, in particular, to a method for generating placements for analog ICs using constraint trees.

2. Description of the Prior Art

In modern IC industry, analog ICs gain more and more importance. An analog IC is described by a netlist which includes a set of interconnected device modules such as transistors, capacitors, resisters and other devices. The functionality and performance of the analog ICs are heavily influenced by the placement of the device modules of the circuits. A computer-implemented placement tool processes a netlist to determine a suitable position and orientation for each of the device modules within the IC. To guarantee a correct functionality and best performance for the analog ICs, a set of constraints are provided for placing the device modules.

For example, "symmetry constraint" is introduced to reduce the effect of parasitic mismatches and circuit sensitivity to thermal gradients or process variations. According to the symmetry constraint, two device modules are placed symmetrically with respect to a common axis. Symmetry constraints are typically categorized into three types. The first type is horizontal one-dimensional symmetry constraint; the second type is vertical one-dimensional symmetry constraint; and the third type is two-dimensional symmetry constraint.

Another example is "proximity constraint" or "cluster constraint" which limits a particular group of devices placed near one another so that they can be interconnected by short wires.

Another common example of constraints is "matching constraint" which specifies a pre-defined matching placement pattern for a circuit. For instance, a current mirror circuit comprises two transistors which should be tightly coupled with a specific gate orientation. Other constraints such as spacing, boundary, clearance, etc., are also well-known and commonly used in analog IC placement.

U.S. Pat. No. 7,873,928 entitled "Hierarchical Analog IC Placement Subject to Symmetry, Matching and Proximity Constraints" discloses a method of defining a multiple-level hierarchy of constraint groups and generating an optimal placement. However, the proposed approach assumes that all the constraints are self-contained and does not mention how to deal with constraint conflicts.

FIG. 1 depicts a block diagram which illustrates a general concept of a prior approach in how to handle constraints. Block 11 represents a set of constraints for an IC design. The constraints 11 are directly saved into a constraint database 12 without any additional checking. A placer 13 refers to the constraint database 12 and tries to find placements that satisfy all the constraints in the constraint database 12.

However, constraints can conflict with each other. It means that two constraints cannot be satisfied at the same time. Thus all the placer 13 can do is trying to satisfy as many constraints as possible without analyzing the conflicts in a systematical way.

Therefore, what is needed is a systematic approach to analyze an IC design and its corresponding constraints. In addition, the analysis result should be able to detect and resolve conflicts of constraints. Furthermore, it is desired to find a systematic approach to generate placements for the IC design while meeting all the constraints based on the analysis result.

SUMMARY OF THE INVENTION

One object of the present invention is to generate placements for a plurality of device modules within an analog integrated circuit (IC) subject to a set of constraints.

One embodiment in the present invention is to provide a computer-implemented method to partition the IC design into a hierarchy of groups of device modules by building a hierarchy tree of constraints to associate each of the groups with the corresponding constraint in a prioritized order. In the hierarchy tree, a root node represents the IC design; a plurality of nodes represents either the constraints or the device modules within the IC.

In the process of building the hierarchy tree, conflicts of constraints can be identified by checking whether nodes representing the constraints can be successfully inserted into the hierarchy tree or not. Furthermore, conflicts of the constraints can be resolved by removing the conflicted constraints with lower priorities.

Based on the hierarchy tree, a bottom-to-top process can be executed to generate placements for each of the constraints at a node. In addition, a cost-function is defined which may refer to the dimensions, and possibly other characteristics, of a placement; and each placement will be evaluated based on the cost function to prune some placements with higher costs. Moreover, placements can be further optimized by using a top-down process for wire length optimization.

Other objects, technical contents, features and advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein:

FIG. 7A-FIG. 7C show an example to explain the process of generating a placement using bottom-to-top process.

DETAILED DESCRIPTION OF THE INVENTION

The detailed explanation of the present invention is described as following. The described preferred embodiments are presented for purposes of illustrations and description, and they are not intended to limit the scope of the present invention.

An analog integrated circuit (IC) design is typically provided in the form of a netlist having a plurality of interconnected device modules. Furthermore, a plurality of constraints are provided for generating the placement of the IC design.

In order to avoid possible ambiguity and to improve performance for placement generation, it is necessary to first analyze the relationship among the constraints, and a constraint hierarchy tree is introduced for this purpose. The IC design is partitioned into hierarchical groups of device modules in order to meet the constraints. Afterwards, a placement process is executed to reassemble the partitioned groups of device modules into a complete placement for the IC based on the constraint hierarchy tree systematically.

Figure 1:
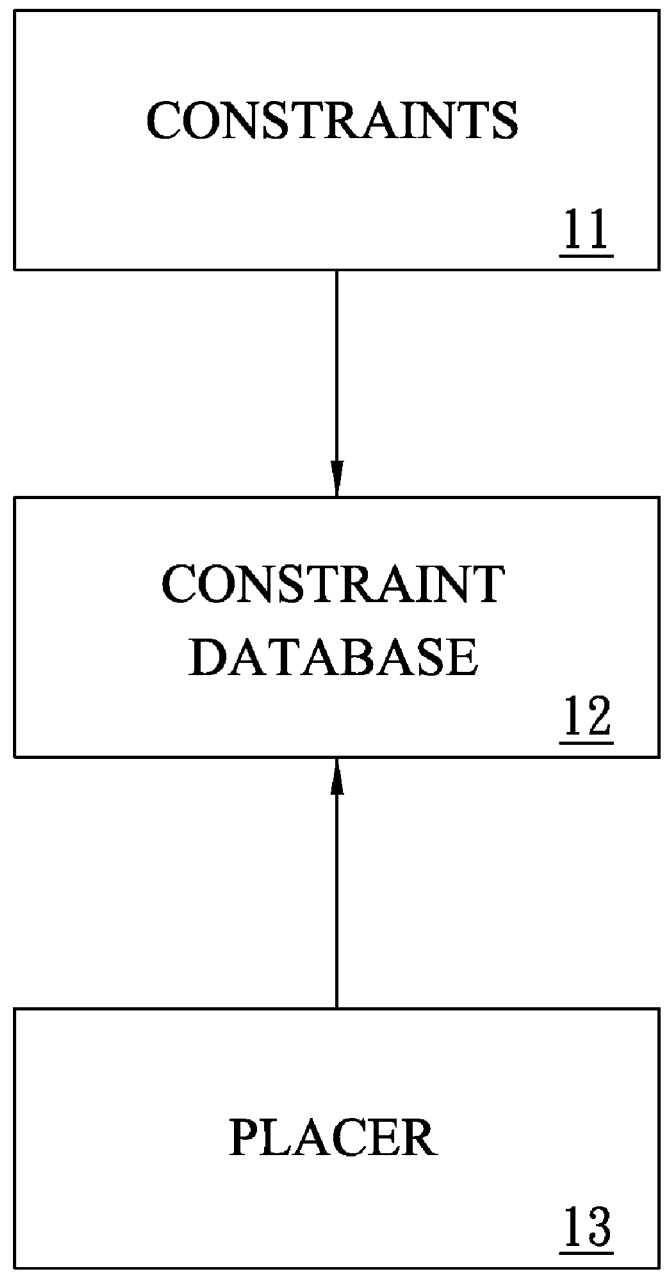
FIG. 1 is a schematic block diagram of a prior approach to handle constraints.
Figure 2:
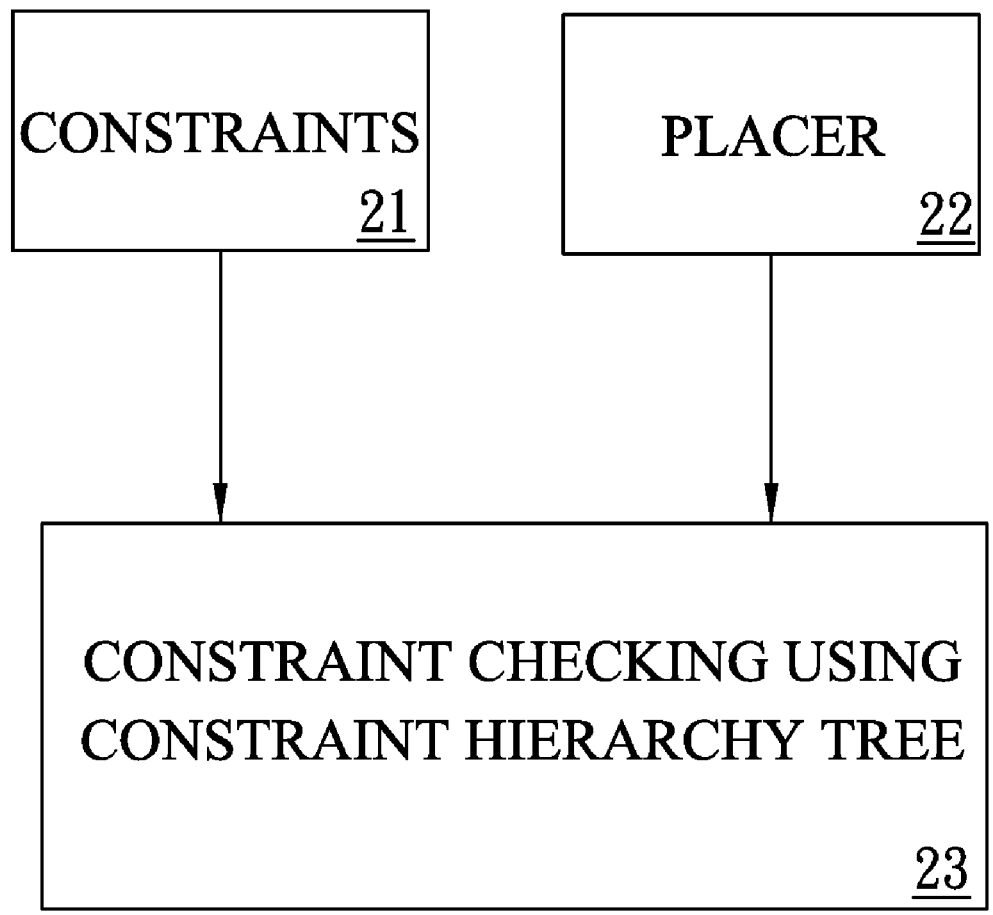
FIG. 2 is a schematic block diagram of the present invention.

FIG. 2 illustrates a general concept of the invention. Block 23 is responsible for building a constraint hierarchy tree according to the set of constraints (block 21). A placer (block 22) refers to the hierarchy tree built by block 21 for generating placements of the IC design. Further details are described in the following sections.

Hierarchy Tree Generation

Figure 3A:
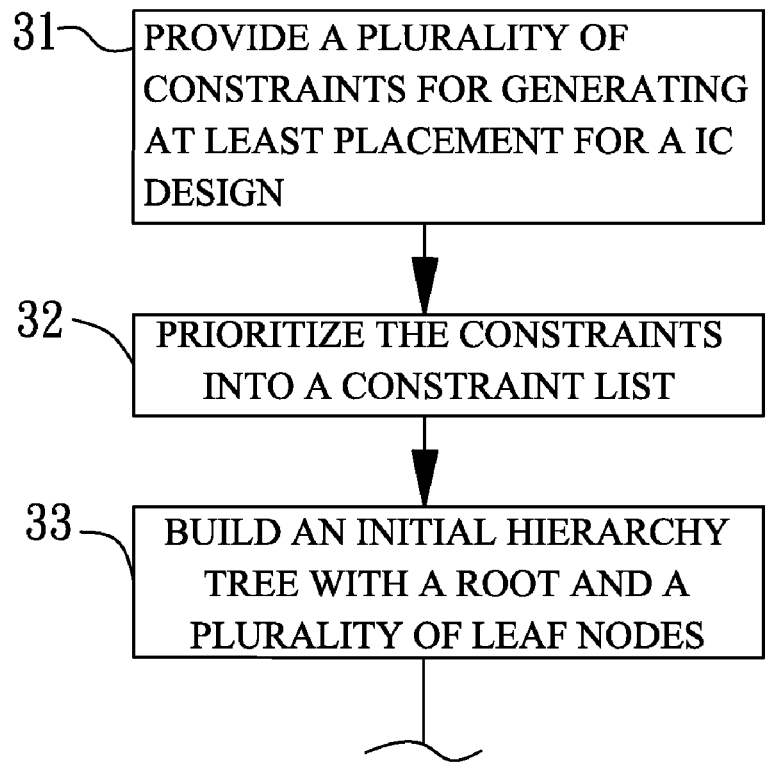
FIG. 3A and FIG. 3B illustrate a schematic flow diagram for creating a hierarchy tree and generating a placement.
Figure 3B:
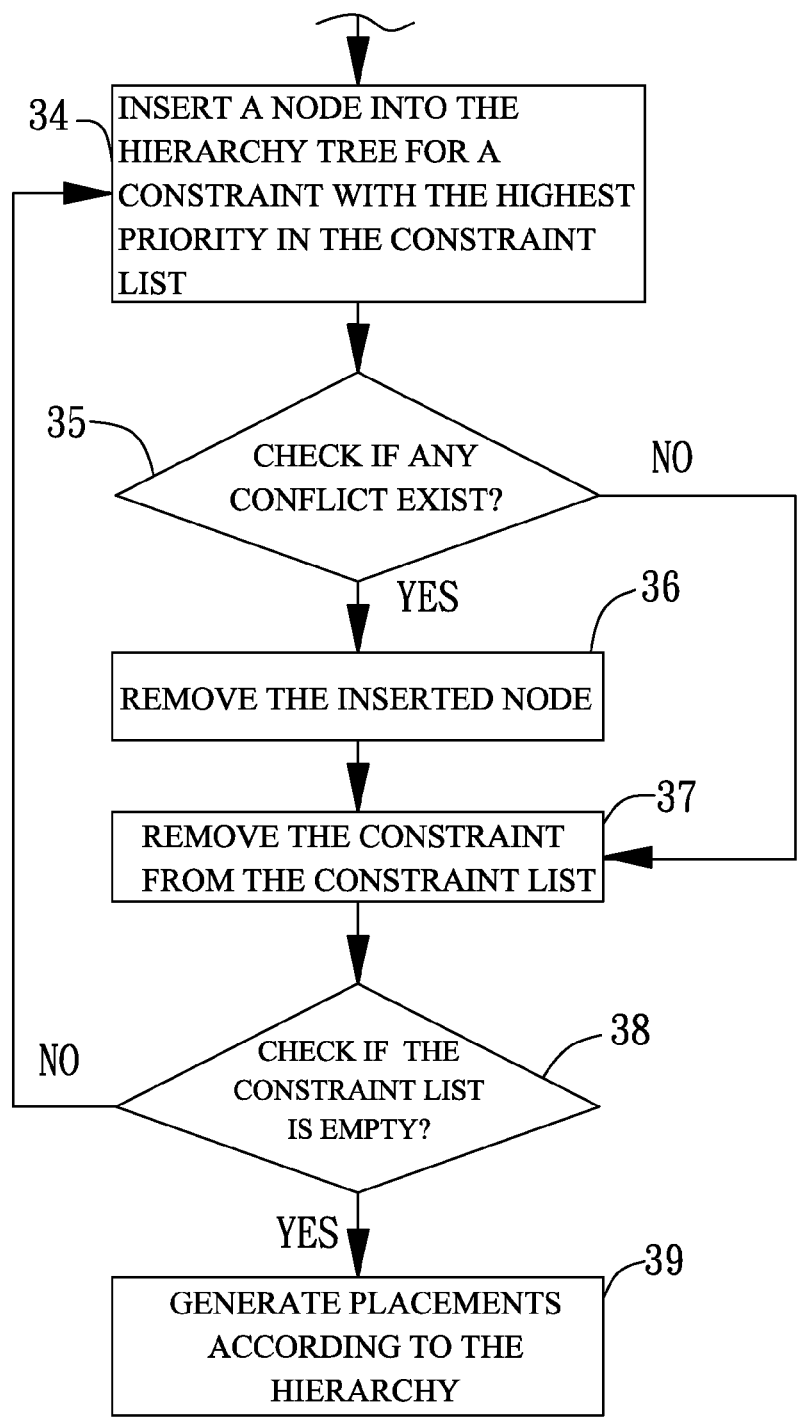

FIG. 3A and FIG. 3B show a schematic flow diagram which illustrates a method of processing the netlist to generate a hierarchy tree which is used to further generate possible placements for the IC design. Moreover, the method ensures that there exist no conflicts among the constraints in the hierarchy tree when it is finally built successfully.

First, please refer to FIG. 3A. A plurality of constraints are provided for the IC design (step 31). Some of the constraints may come from an existing database or can be provided by users. Others of the constraints can be obtained by matching the IC design with a plurality of pre-defined circuit patterns to extract the constraints. One example is to extract cluster constraints according to a plurality of identified circuit building blocks, such as voltage-controlled resistor, current mirror load, level shifter and differential pairs; another example is to extract cluster constraints by identifying device modules of the same type (e.g., PMOS and NMOS) with similar connection; and yet another example is to extract symmetry constraints by measuring all current flows from the power (VDD) to the ground (GND) of the IC design. If two current flows which are associated with two set of device modules respectively are of the same parameters, the corresponding two paths of the two current flows are identified to be symmetric. Consequently, each of the device modules in one path and the corresponding device module in the other path form a symmetry pair. In step 32, the constraints are prioritized and a list of constraints is formed according to their priorities. Please note that a constraint which covers a smaller scope typically gains a higher priority.

In step 33, according to the information in the netlist, an initial hierarchy tree is built. The initial hierarchy tree is a two-level tree which comprises a root node and a plurality of leaf nodes. The root node represents the IC design. Each of the leaf nodes represents one device module in the IC design.

Referring to step 34 in FIG. 3B, a node associated with a constraint with the highest priority in the constraint list is inserted into the hierarchy tree. The node represents the constraint. Furthermore, corresponding attributes for the constraint can be recorded in the node. For example, if the constraint is a symmetry constraint, attributes such as symmetry pairs and symmetry axes are recorded. If the constraint is a matching constraint, a corresponding matching placement pattern is recorded as an attribute.

In addition, there is only a single route for each of the leaf node to reach the root node. A node is eventually inserted into the existing hierarchy tree when there is no conflict between the constraint of the node and the constraints already existing in the hierarchy tree. In other words, if more than one route is found for any one of the leaf nodes to reach the root node after a constraint node is inserted, there is a conflict between the just-inserted constraint and the constraints currently in the hierarchy tree as shown in step 35. To resolve the conflict, the inserted node representing the constraint is removed as illustrated in step 36, in other words, the constraint is discarded (and may be reported to the user accordingly). In step 37, the constraint which has been processed is removed from the constraint list. Then, if the constraint list is not empty in step 38, a constraint with the highest priority in current constraint list will be processed by repeating step 34 to step 38. If the constraint list is empty, the final hierarchy tree is built, and then at least one placement can be generated according to the hierarchy tree in step 39. The details of generating the placements will be described later.

In one embodiment, if users need to refine constraints, it can be done by inserting, moving, or removing related nodes for the corresponding constraints on the constraint hierarchy tree directly. A graphical user interface may be used to display the tree, and the user can edit the tree visually and interactively. The edited tree can be used to produce a new list of constraints to save on disk. Through this systematic way, we can ensure that the refinement will not introduce any conflicts.

FIGS. 4A-4E illustrate an example of hierarchy tree generation. An IC design comprises device modules D1, D2, D3, D4, D5, D6 and D7, and four constraints are provided. The first constraint is a symmetry constraint (denoted as S0) which D5, D6 and D7 are subject to, i.e. constraint S0 is applied to device modules D5, D6 and D7; the second constraint is a cluster constraint (denoted as C0) which D1 and D2 are subject to; the third constraint is a cluster constraint (denoted as C1) which D3 and D4 are subject to; and the fourth constraint is a cluster constraint (denoted as C2) which D4 and D5 are subject to.

Figure 4A:
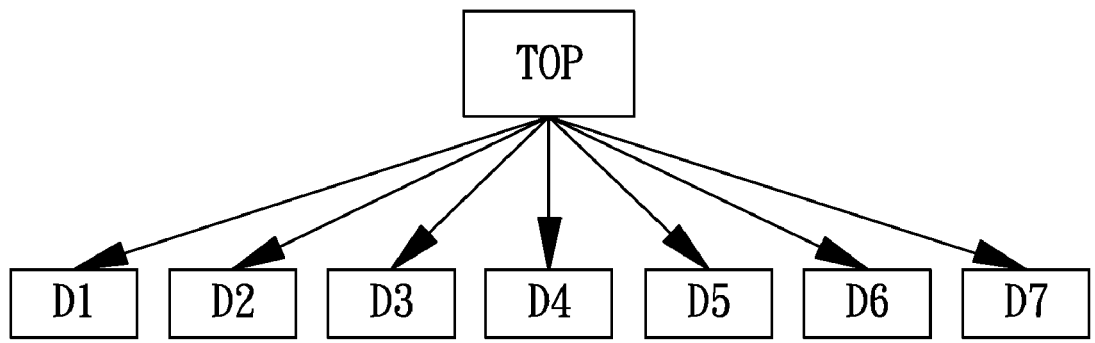
FIG. 4A-FIG. 4H show an example to explain the process of hierarchy tree creation.

In order to build the hierarchy tree with constraints, a two-level hierarchy tree is initiated as shown in FIG. 4A in which a root node is denoted as "TOP" and seven leaf nodes are created for device modules D1-D7; and the constraints are prioritized in the order of S0, C0, C1 and C2.

Figure 4B:
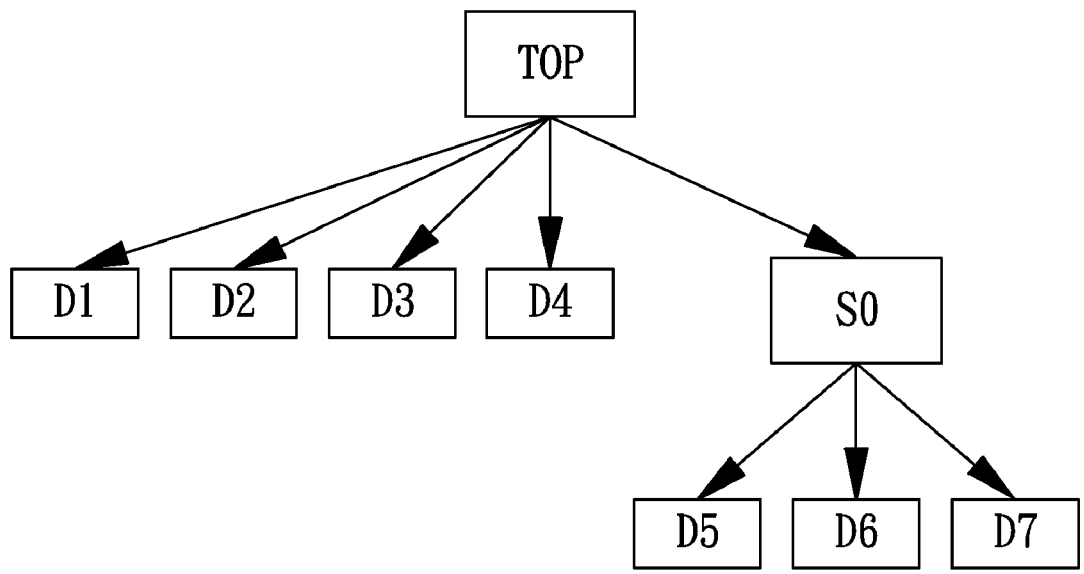
Figure 4C:
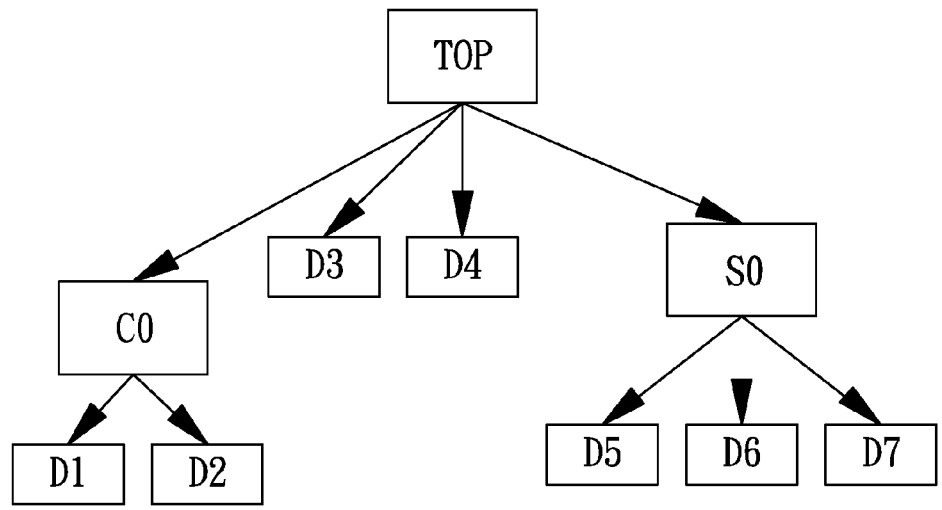
Figure 4D:
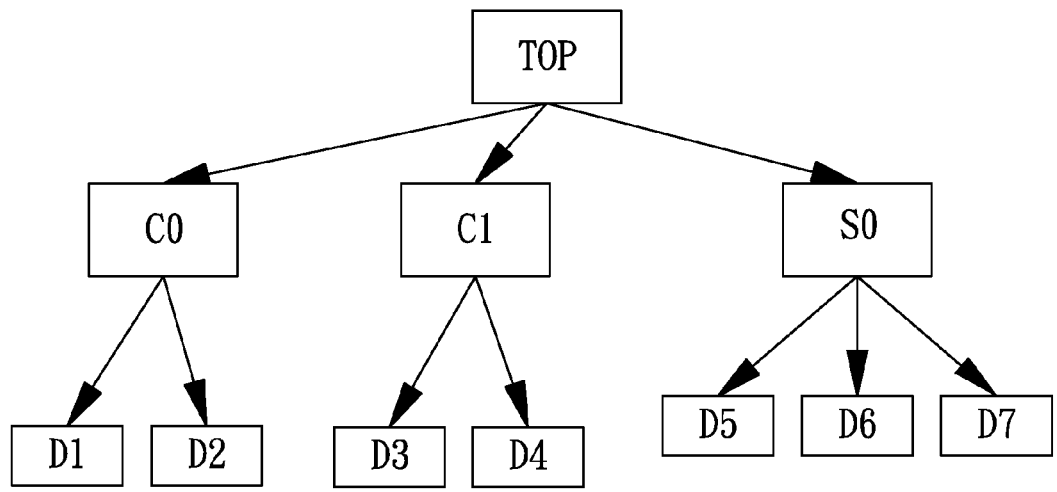

As shown in FIG. 4B, a node "S0" is inserted according to the constraint S0. For a symmetry constraint, some attributes, such as symmetry pairs and symmetry axes, are recorded and associated with the corresponding node. Then, as shown in FIG. 4C, a node "C0" is inserted according to the constraint C0, and no conflict is detected. Next, a node "C1" is inserted according to the constraint C1 as shown in FIG. 4D, and no conflict is detected either.

Figure 4E:
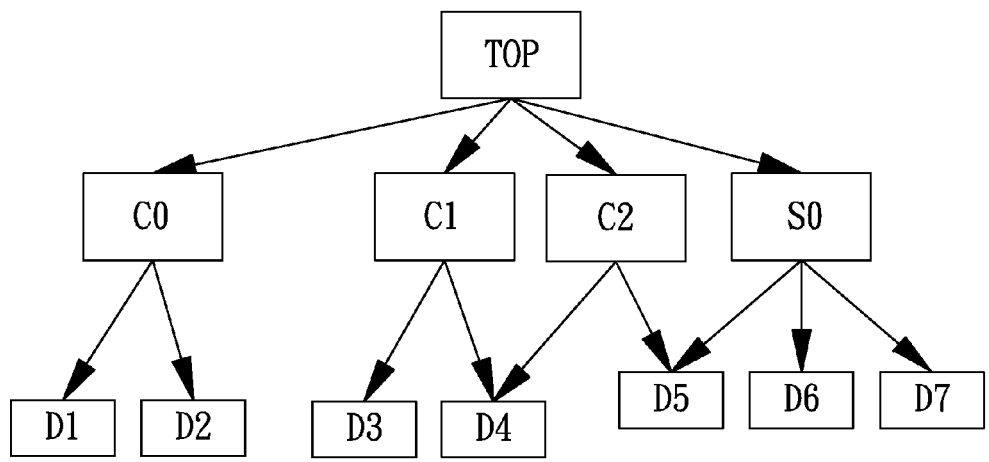

Finally, as shown in FIG. 4E, a node "C2" is inserted according to the constraint C2. However, two routes can be found from leaf node D4 to reach the root node; and the same situation applies to leaf node D5 as well, which means the C2 constraint conflicts with the existing constraints and thus should be removed; and the hierarchy tree should be remained as it is in FIG. 4D.

After executing the above steps, a hierarchy tree is built with three constraints, S0, C0 and C1, without any conflict, and the other constraint, C2, is discarded.

Figure 4F:
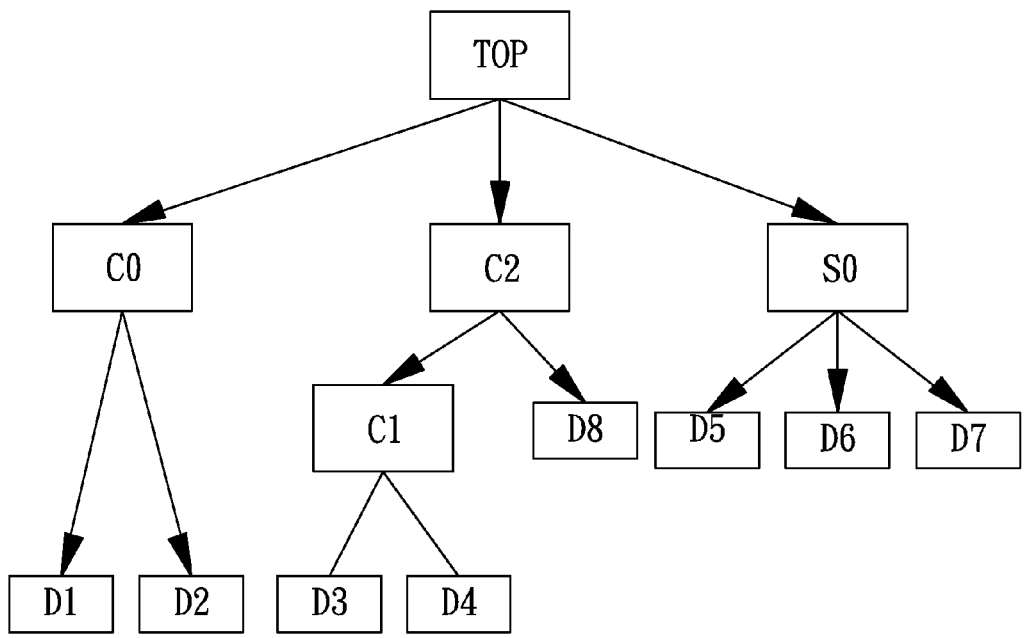
Figure 4G:
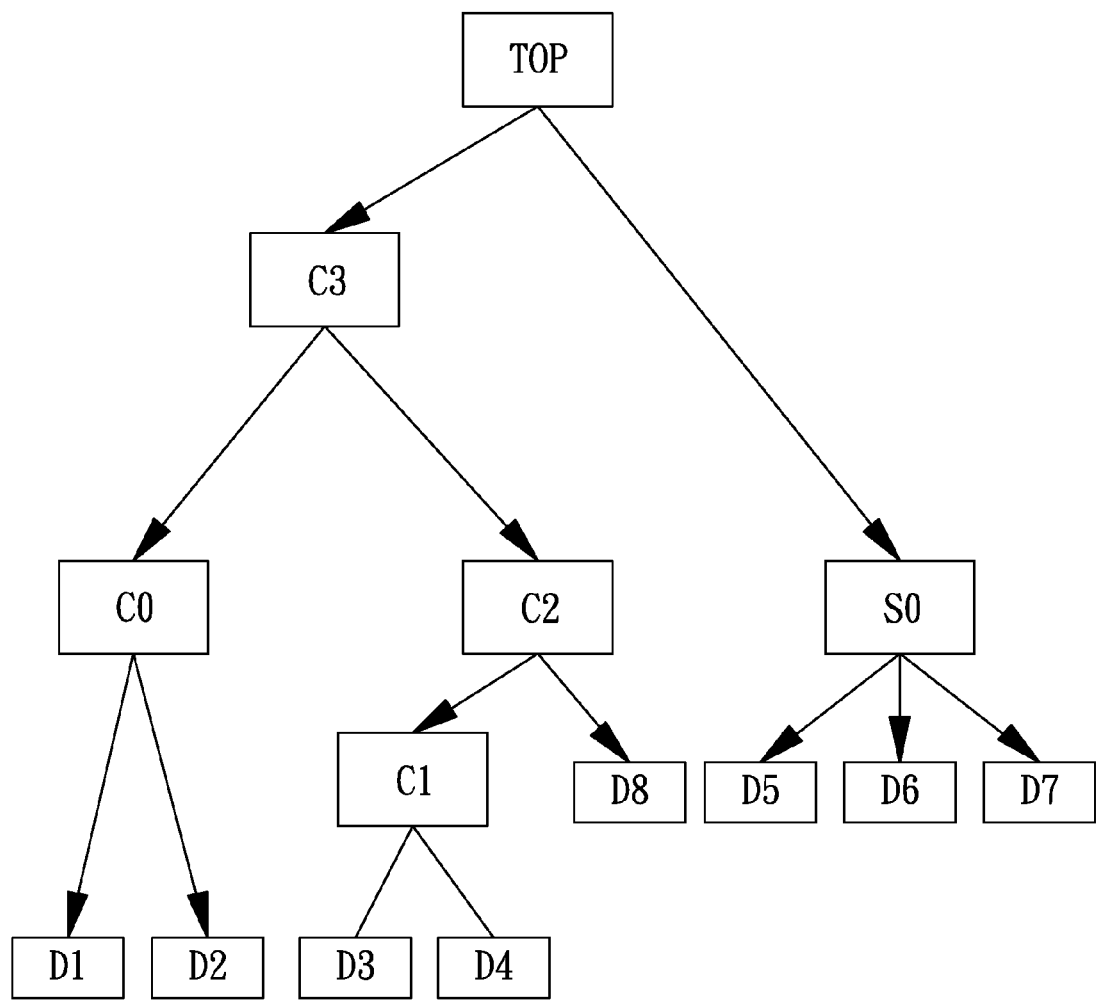
Figure 4H:
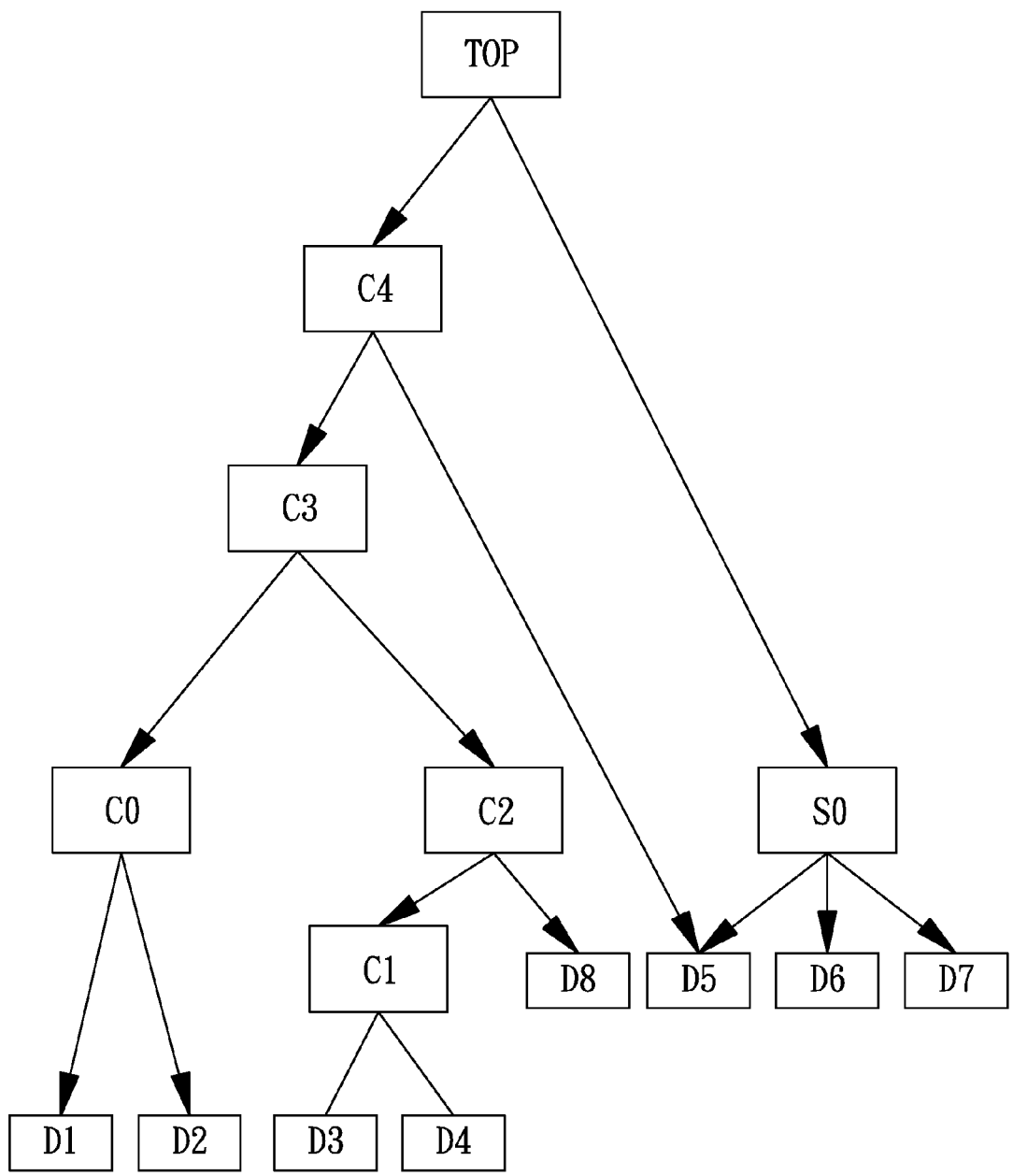

Please continue to refer to FIG. 4F to FIG. 4H which depict an example for multi-level constraints. An IC design comprises device modules D1, D2, D3, D4, D5, D6, D7 and D8, and six constraints are provided for generating placements. The first constraint is a symmetry constraint (denoted as S0) which D5, D6 and D7 are subject to; the second constraint is a cluster constraint (denoted as C0) which D1 and D2 are subject to; the third constraint is a cluster constraint (denoted as C1) which D3 and D4 are subject to; the fourth constraint is a cluster constraint (denoted as C2) which C1 and D8 are subject to; the fifth constraint is a cluster constraint (denoted as C3) which C0 and C2 are subject to; and the sixth constraint is a cluster constraint (denoted as C4) which C3 and D5 are subject to. In addition, the constraints are prioritized in the order of S0, C0, C1, C2, C3 and C4.

After applying the same steps as in FIG. 4A to FIG. 4D for S0, C0, and C1, a node for constraint C2 can be inserted in a similar way as shown in FIG. 4F, wherein the child nodes of C2 are C1 and D8. Next, a node for constraint C3 is further inserted as illustrated in FIG. 4G, wherein the child nodes of C3 are C0 and C2. Finally, a node for constraint C4 is inserted as in FIG. 4H in which a conflict is found, therefore, the constraint C4 should be discarded.

From the examples demonstrated in FIG. 4A to FIG. 4H, it is concluded that there are two ways to detect conflicts among constraints. The first way is to check if more than one route can be found for any leaf node to reach the root node. As shown in FIG. 4E, device module D4 has two routes to reach the root node, which indicates a conflict. The second way is to check if two constraints have a common set of device modules, wherein the common set of device modules is not equal to the set of device modules of one of the two constraints, and the common set of device modules is not equal to the set of device modules of the other of the two constraints. Referring to FIG. 4E again to compare the device modules of C1 and C2, there is a common device module D4 between C1 and C2. Furthermore, D4 is not equal to the set formed by D3 and D4; D4 is not equal to the set formed by D4 and D5, either. By using this way, a conflict can be detected as well.

Figure 5:
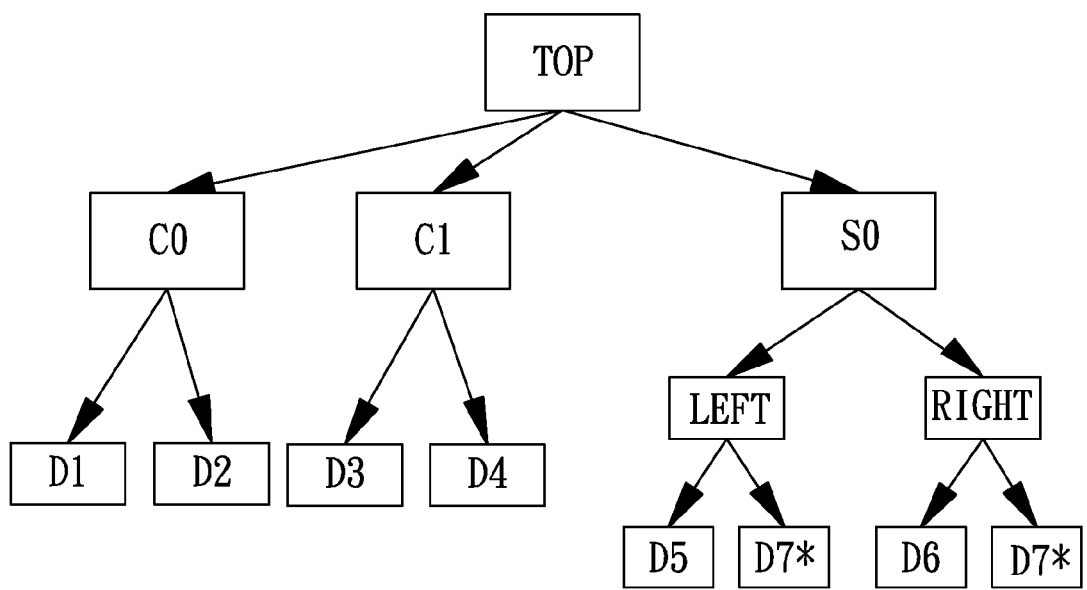
FIG. 5 shows one embodiment to represent a symmetry constraint when creating a hierarchy tree.

Regarding representing a symmetry constraint in the hierarchy tree, in one embodiment, two additional nodes can be inserted under the node representing the constraint to create symmetrical sub-groups for the corresponding device modules. Please refer to FIG. 5 which illustrates the presentation for the example mentioned in FIGS. 4A-4E. Under the node S0, two nodes, "LEFT" and "RIGHT", are inserted to indicate that the corresponding device modules are placed symmetrically with respect to a vertical axis. Furthermore, D5 and D7* are arranged under node "LEFT" and D6 and D7* are arranged under node "RIGHT", which means D5 and D6 are symmetric with respect to the vertical axis and D7 is self-symmetric with respect to the vertical axis.

Additionally, based on the nature of constraints, some constraints do not affect the structure of the hierarchy tree. In other words, it is not necessary to insert a node for those constraints, and these constraints will be treated as attributes when generating placements. Therefore, the above-mentioned constraints should be recorded in the nodes of the hierarchy tree for placement generation. For example, given an alignment constraint applied to a set of device modules which are subject to a cluster constraint, the alignment property will be recorded in the node which represents the cluster constraint. Another example is that, given a clearance constraint applied to a set of device modules which are subject to a cluster constraint, the clearance range will be recorded in the node which represents the cluster constraint. The above-mentioned constraints which do not affect the structure of the hierarchy tree will be referenced when generating placements.

Bottom-to-Top Placement Generation

Figure 6:
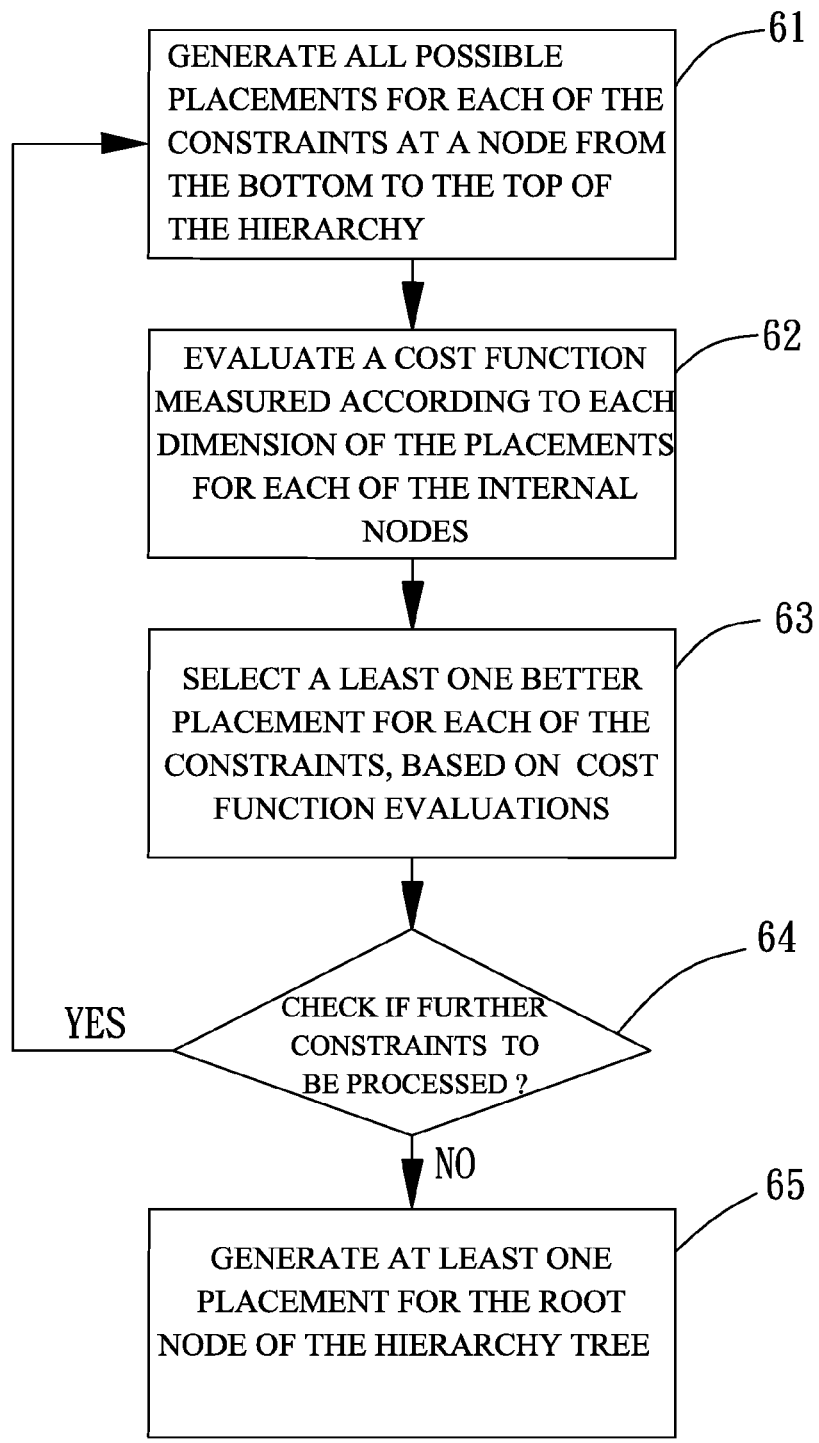
FIG. 6 illustrates a schematic flow diagram for bottom-to-top placement generation process.

For an IC design, typically at least one set of width and height dimensions is defined for each of the device modules, and a cost function can be used to measure a placement quality according to the dimensions of the device modules. Please refer to FIG. 6 which further depicts a detailed flow diagram for placement generation based on a hierarchy tree for the IC design.

First, all possible placements are generated for each of the nodes which represent constraints from the bottom to the top of the hierarchy tree (step 61).

Next, a cost function is evaluated for each placement associated with each of the constraints in step 62. Then, according to the cost function evaluations, at least one better placement can be chosen for each of the nodes in step 63. Thus, the number of possible placements in upper level of nodes can be reduced because some high-cost placements are pruned. As a result, the runtime of the placement program can be reduced. After confirming that no further nodes to be processed in step 64, at least one placement for the root node can be generated by combining the placements of the root node's child nodes in step 65.

Note that any floorplanning method (such as simulated annealing, greedy algorithm, etc.) and any floorplanning representation (such as sequence pair, B*-tree, transitive closure graph (TCG), etc.) can be used at step 61 and 65 as long as it can generate placement results. The details are not described herein.

Figure 7A:
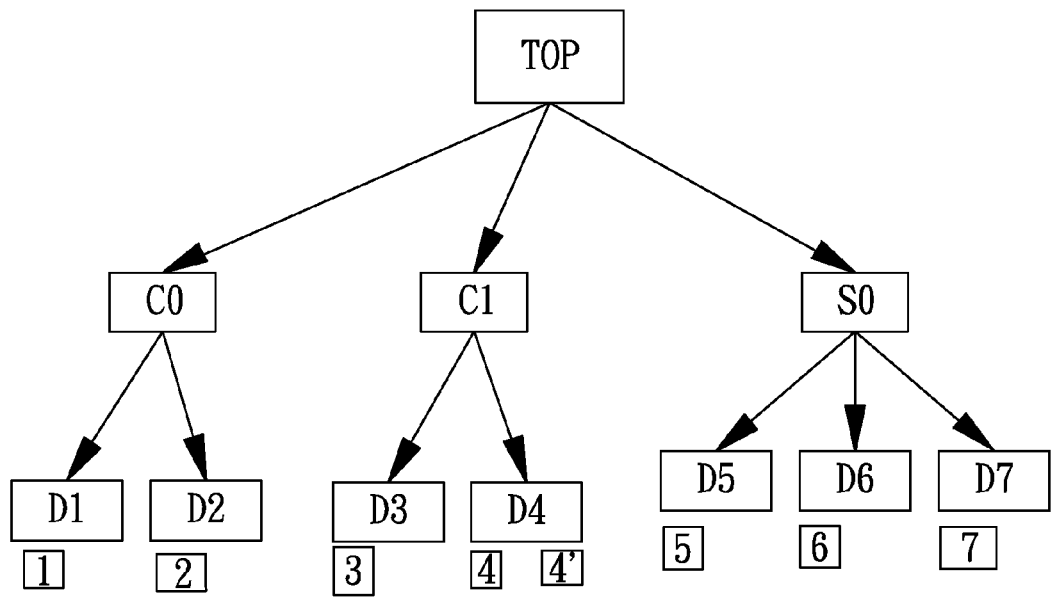
Figure 7B:
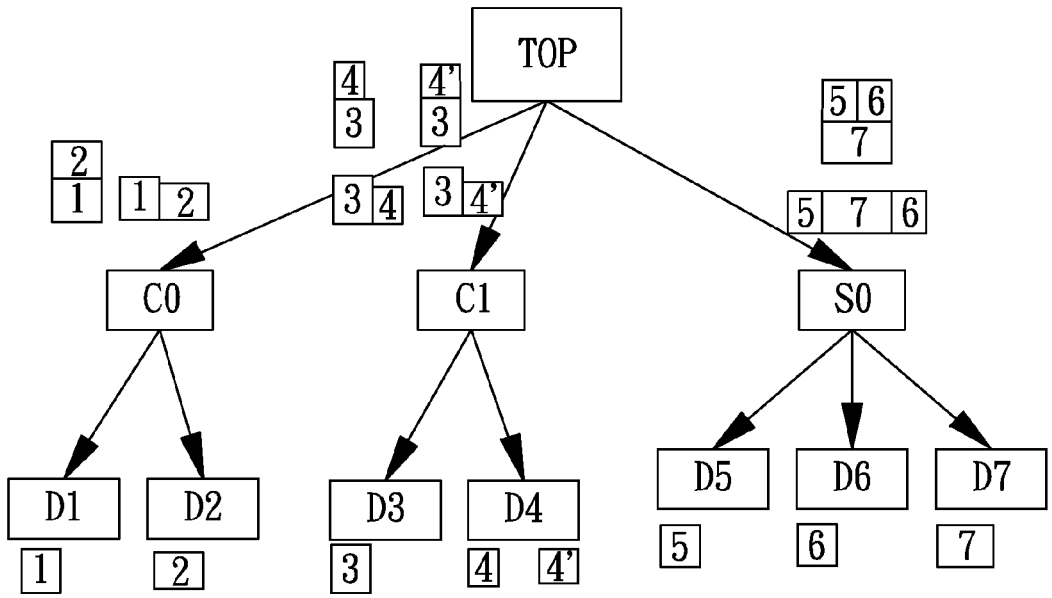
Figure 7C:
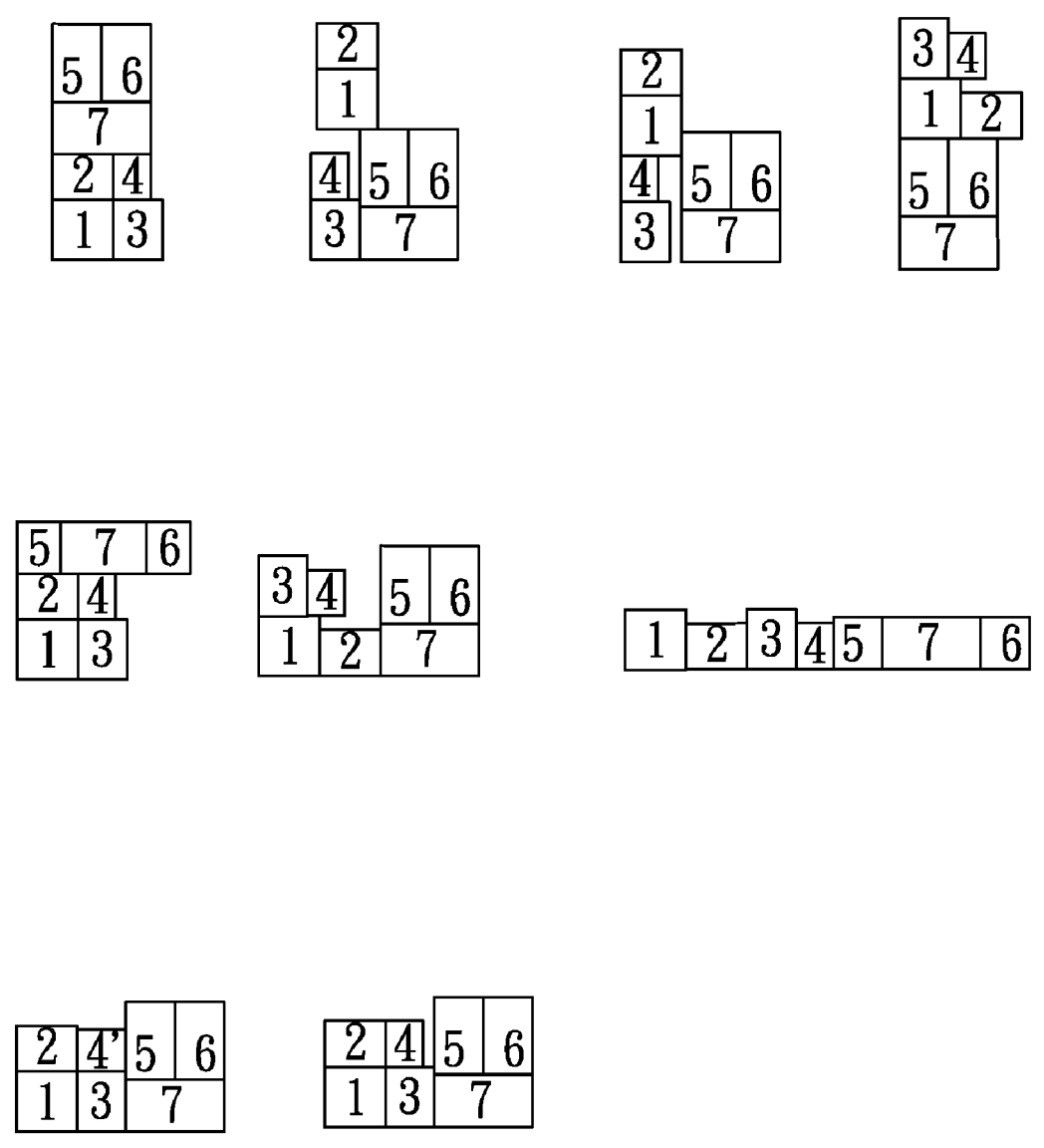

FIGS. 7A-7C illustrate an example of bottom-to-top placement generation according to a built constrain hierarchy tree. In FIG. 7A, dimensions are defined for each of the device modules which are represented by the leaf nodes. Note that two possible dimensions are recorded for device module D4. Next, all possible placements for C0 and C1 are generated and recorded in the corresponding nodes. All possible placements for S0 are also generated and recorded in the corresponding nodes according to the symmetry attributes. FIG. 7B shows some of the possible placements for C0, C1 and S0. Finally, all possible placements are generated according the placements which are generated for C0, C1 and S0. Note that only some of the possible placements for the root node are shown in FIG. 7C.

Top-Down Wire Length Optimization

Although dimension optimization is done for the placements through the bottom-to-top process as described above, placements with same dimensions may have different total wire lengths. Thus we can further optimize total wire length by using a top-down approach while keeping placement dimensions the same or even smaller.

Figure 8A:
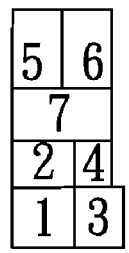
FIG. 8A-FIG. 8D show an example to explain the process of top-down wire length optimization.
Figure 8A:
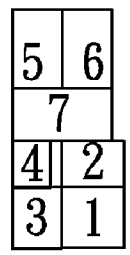
Figure 8A:
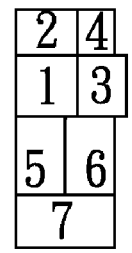
Figure 8A:
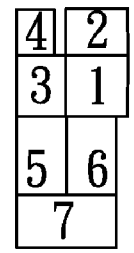

Using the example mentioned above, FIG. 8A shows the result of rearranging one of the placements of the root node while keeping dimensions the same. Then at least one placement can be chosen with the smallest wire length.

Figure 8B:
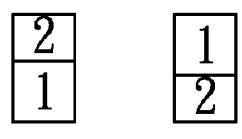
Figure 8C:
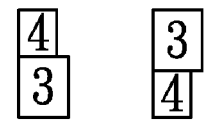
Figure 8D:
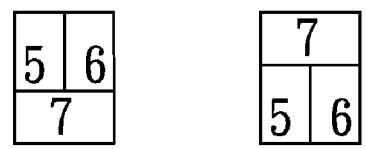

The similar step can be performed for each of the constraints from the top to the bottom of the hierarchy tree. FIGS. 8B-8D show some placements for wire length optimization. As a result, at least one placement with smaller wire length can be selected from the placements to optimize the wire length for each of the nodes in the hierarchy tree by using the top-down process.

It is to be noted that during the top-down process for wire length optimization, the "current best" placement for the root note is always used for calculating the differences caused by various placements within the current node. After the placement with smallest total wire length is chosen for the current node, the "current best" placement for the root node is updated accordingly. Then, the process moves on to the next node in the hierarchy, and the optimization process continues.

In summary, the invention provides a systematic way to analyze the constraints for generating placements for an IC design. A constraint hierarchy tree is built according to each of the constraints systematically to identify and resolve the conflicts among the constraints. Once the hierarchy tree is built, a systematic placement process can be performed to generate at least one placement efficiently.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the Claims appended hereto and their equivalents.

What is claimed is:

1. A computer-implemented method for generating at least one placement for an integrated circuit (IC), wherein the integrated circuit (IC) comprises a plurality of device modules, the method comprising using a computer to perform the steps of:
    a. receiving a plurality of constraints for generating at least one placement for the integrated circuit (IC), wherein each constraint is assigned a priority;
    b. forming, using the computer, a constraint hierarchy tree comprising a root node, a plurality of internal nodes and a plurality of leaf nodes according to the plurality of constraints, wherein the root node represents the placement of the integrated circuit (IC), each of the internal nodes represents a constraint for its corresponding set of the device modules respectively and each of the leaf nodes represents its corresponding device module respectively, the step comprising the sub-steps of:
        b1. building an initial hierarchy tree comprising the root node and the plurality of leaf nodes; and
        b2. selecting each of the plurality of constraints in descending order of assigned priorities, and for each selected constraint, inserting an internal node representing the said constraint into the hierarchy tree, wherein if a conflict is found between the said constraint and any of the other constraints in the hierarchy tree, discard the said constraint to remove the conflict, and remove the said internal node; and
    c. generating at least one placement for the integrated circuit (IC) by satisfying each of the constraints in the hierarchy tree from the bottom to the top of the tree sequentially.

2. The computer-implemented method according to claim 1, wherein the conflict is found in step b2 if more than one route is found for any leaf node to reach the root node.

3. The computer-implemented method according to claim 1, wherein the conflict is found in step b2 if the said constraint and any of the constraints in the hierarchy tree have a common set of device modules, wherein the common set of device modules is not equal to the set of device modules of the said constraint, and the common set of device modules is not equal to the set of device modules of said any of the constraints in the hierarchy tree.

4. The computer-implemented method according to claim 1, wherein step a further comprises forming a constraint list in an order according to the priorities of the plurality of constraints and step b forms the constraint hierarchy tree according to the constraint list in an order according to the priorities of the plurality of constraints.

5. The computer-implemented method according to claim 4, wherein step b2 comprises the sub-steps of:
    b21. inserting an internal node representing the constraint which has the highest priority in the constraint list into the hierarchy tree; and removing the internal node if a conflict is found between the constraint and any of the other constraints in the hierarchy tree; and
    b22. removing the constraint from the constraint list and repeating step b21 until the constraint list is empty.

6. The computer-implemented method according to claim 5, wherein the conflict is found in step b21 if more than one route is found for any leaf node to reach the root node.

7. The computer-implemented method according to claim 5, wherein the conflict is found in step b21 if the constraint and any of the other constraints in the hierarchy tree have a common set of device modules, wherein the common set of device modules is not equal to the set of device modules of the constraint, and the common set of device modules is not equal to the set of device modules of said any of the other constraints in the hierarchy tree.

8. The computer-implemented method according to claim 1, wherein at least one dimension is defined for each of the device modules and a cost function is defined to measure a placement quality according to the dimensions of the device modules; and generating the placement for the integrated circuit (IC) for each of the constraints in step c comprises the steps of:
    c1. generating a plurality of placements that satisfy the constraint at a node; and
    c2. selecting at least one placement from the plurality of placements at the node according to the cost function.

9. The computer-implemented method according to claim 8, wherein step c2 further comprises recording the selected placements associated with the node.

10. The computer-implemented method according to claim 9, wherein step c further comprises the steps of:
    c3. for each of the constraints, modifying the selected placements to generate at least one placement with smaller wire length according to the constraints from the top to the bottom of the constraint hierarchy tree sequentially, wherein the dimension of the placements for each of the constraint does not increase.

11. The computer-implemented method according to claim 1, wherein the type of the constraints comprises matching, symmetry or cluster.

12. The computer-implemented method according to claim 11, wherein one of the constraints is a matching constraint, wherein step b2 further comprises recording a corresponding matching placement pattern in the node associated with the matching constraint.

13. The computer-implemented method according to claim 11, wherein one of the constraints is a symmetry constraint, wherein step b2 further comprises recording a set of corresponding symmetry attributes in the node associated with the symmetry constraint.

14. The computer-implemented method according to claim 11, wherein one of the constraints is a symmetry constraint, wherein step b2 further comprises inserting internal nodes under the node representing the symmetry constraint, wherein the internal nodes group the leaf nodes according to a common symmetry axis with respect to the constraint.

15. The computer-implemented method according to claim 11, wherein one of the constraints is a cluster constraint, wherein an alignment constraint or a clearance constraint is associated with the cluster constraint, and step b further comprises recording the alignment constraint or the clearance constraint in the corresponding node of the cluster constraint.

16. The computer-implemented method according to claim 1, further comprising a step c0 after step b, wherein the step c0 comprises editing the constraints in the hierarchy tree interactively.

17. The computer-implemented method according to claim 16, wherein said editing includes inserting, moving, or removing nodes in the hierarchy tree.

18. A computer-implemented method for updating constraints for an integrated circuit (IC), wherein the integrated circuit (IC) comprises a plurality of device modules, the method comprising using a computer to perform the steps of:
  a. receiving a first set of constraints for the integrated circuit (IC), wherein each constraint is assigned a priority;
  b. forming, using the computer, a first constraint hierarchy tree comprising a root node, a plurality of internal nodes and a plurality of leaf nodes according to the first set of constraints, wherein the root node represents the placement of the integrated circuit (IC), each of the internal nodes represents a constraint for its corresponding set of the device modules respectively and each of the leaf nodes represents its corresponding device module respectively, the step comprising the sub-steps of:
     b1. building an initial hierarchy tree comprising the root node and the plurality of leaf nodes; and
     b2. selecting each of the first set of constraints in descending order of assigned priorities, and for each selected constraint, inserting an internal node representing the said constraint into the hierarchy tree, wherein if a conflict is found between the said constraint and any of the other constraints in the hierarchy tree, discard the said constraint to remove the conflict, and remove the said internal node;
  c. editing the constraints in the first constraint hierarchy tree interactively to form a second constraint hierarchy tree; and
  d. generating a second set of constraints according to the second constraint hierarchy tree.

* * * * *